(12) United States Patent
Rainville

(10) Patent No.: US 11,685,536 B2
(45) Date of Patent: Jun. 27, 2023

(54) FUEL CELLS CONFIGURED TO DELIVER BI-POLAR HIGH VOLTAGE DC POWER

(71) Applicant: Bell Helicopter Textron Inc., Fort Worth, TX (US)

(72) Inventor: Joseph Dean Rainville, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 914 days.

(21) Appl. No.: 16/257,726

(22) Filed: Jan. 25, 2019

(65) Prior Publication Data

US 2020/0239148 A1 Jul. 30, 2020

(51) Int. Cl.
| | |
|---|---|
| B64D 27/24 | (2006.01) |
| B64C 27/04 | (2006.01) |
| H01M 8/04537 | (2016.01) |
| B64D 41/00 | (2006.01) |
| H01M 8/04858 | (2016.01) |

(52) U.S. Cl.
CPC .............. *B64D 27/24* (2013.01); *B64C 27/04* (2013.01); *B64D 41/00* (2013.01); *H01M 8/04552* (2013.01); *H01M 8/04567* (2013.01); *H01M 8/04873* (2013.01); *B64D 2041/005* (2013.01); *B64D 2221/00* (2013.01); *H01M 2250/20* (2013.01)

(58) Field of Classification Search
CPC .. B64D 27/24; B64D 41/00; B64D 2041/005; B64D 2221/00; B64C 27/04; H01M 8/04552; H01M 8/04567; H01M 8/04873; H01M 2250/20; H01M 8/04679; H01M 8/0488; Y02T 50/60; Y02T 90/40; Y02E 60/50
See application file for complete search history.

(56) References Cited

U.S. PATENT DOCUMENTS

| | | | | |
|---|---|---|---|---|
| 7,705,490 | B2* | 4/2010 | Srinivasan | H02M 7/497 307/77 |
| 7,974,106 | B2* | 7/2011 | Gurunathan | H02M 7/497 363/69 |
| 2006/0152085 | A1* | 7/2006 | Flett | B60L 9/30 307/75 |
| 2008/0160370 | A1* | 7/2008 | Masse | H01M 16/006 429/432 |
| 2015/0210171 | A1* | 7/2015 | King | B60L 50/40 29/825 |
| 2020/0189395 | A1* | 6/2020 | Takahashi | B60L 3/0061 |

\* cited by examiner

*Primary Examiner* — Valentina Xavier
(74) *Attorney, Agent, or Firm* — Lightfoot & Alford PLLC

(57) ABSTRACT

A fuel-cell system at 540 VDC for powering an electrical load of a rotorcraft with a first fuel cell and a second fuel cell. Each fuel cell is configured identically and features a positive electrical node and a negative electrical node. Each fuel cell is configured to provide one half of the electrical load of the rotorcraft and one half of the voltage of the electrical load.

15 Claims, 3 Drawing Sheets

FUEL CELLS CONFIGURED TO DELIVER BI-POLAR HIGH VOLTAGE DC POWER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventional rotorcraft utilize combustion engines for propulsion and power generation, and these produce noise and environmentally harmful emissions. Fuel cells can provide direct current (DC) power without harmful emissions for propulsion and other uses. Conventionally, fuels cells are utilized with DC-DC converters for regulation of voltage and current from the fuel cells. DC-DC converters configured for aviation use have considerable mass and are burdensome in rotorcraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
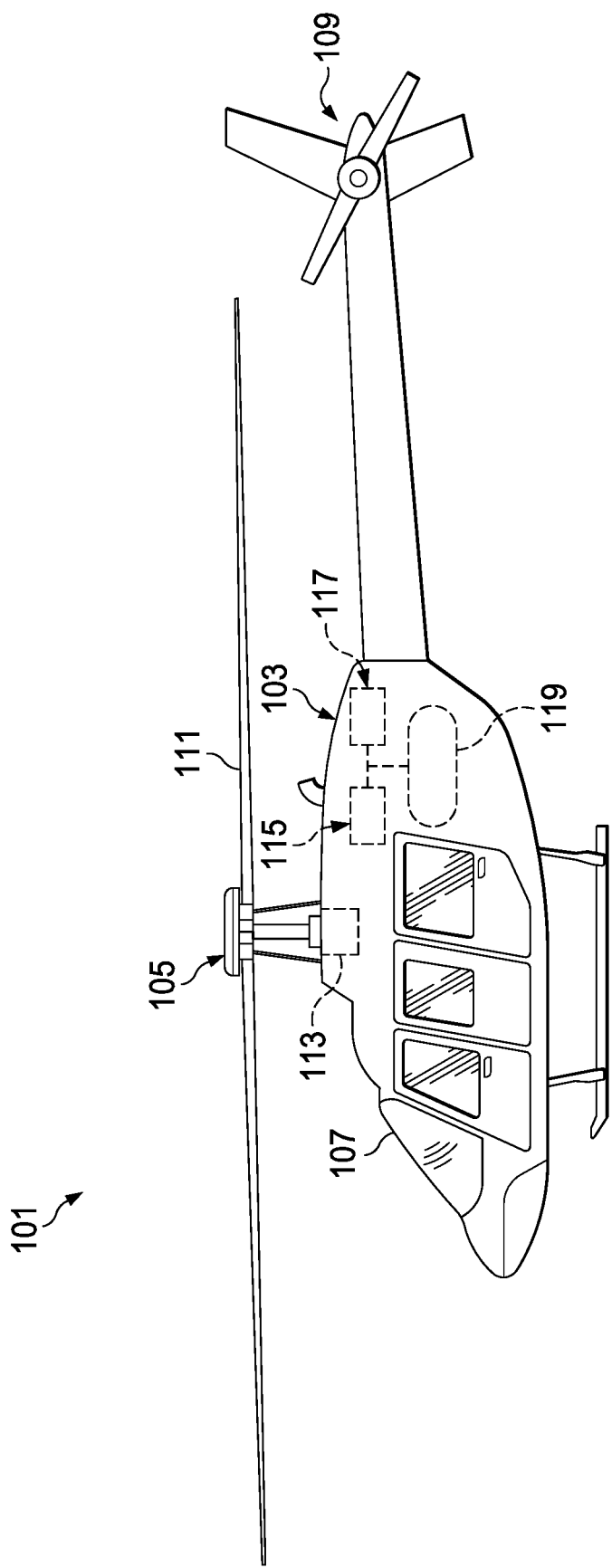
FIG. 1 is a side view of a rotorcraft incorporating a fuel-cell system according to this disclosure.

This disclosure describes a fuel-cell system configured to preferably provide 540 volts of DC power from a pair of fuel cells configured to power an electrical bus. The fuel-cell system can generate bi-polar +/−DC power generally, and specifically can be used for +/−270 volt, or other bi-polar voltage ranges acceptable in the aerospace field, ranging from +/−150 VDC up to +/−300 VDC, thereby resulting in 300 to 600 volts DC at an electrical load. FIG. 1 illustrates a rotorcraft 101 equipped with a fuel-cell system 103 according to this disclosure. Rotorcraft 101 comprises a main-rotor system 105 carried by a fuselage 107 and a tail-rotor system 109 carried by the fuselage 107. Rotor system 105 comprises main-rotor blades 111 and is driven in rotation by electric motor 113 to provide lift for rotorcraft 101, system 105 being controlled with a plurality of control sticks within the fuselage 107. Electric motor 113 and an entire electrical system of rotorcraft 101 is powered by the fuel-cell system 103. Alternatively, the main-rotor system 105 is driven by a conventional combustion engine and the fuel-cell system 103 provides electrical power to rest of the rotorcraft 101.

Figure 2:
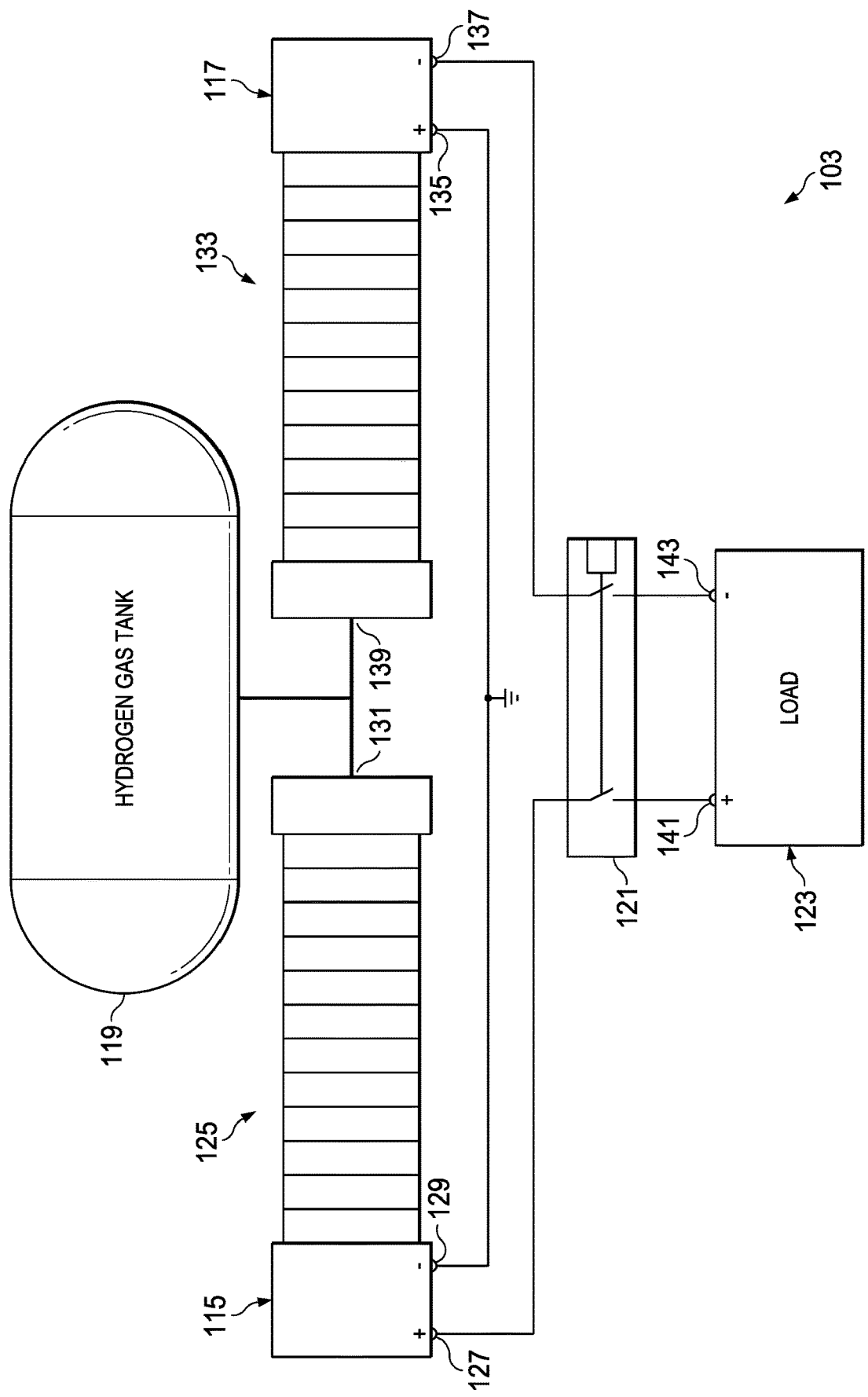
FIG. 2 is a schematic view of the fuel-cell system of the rotorcraft of FIG. 1.

FIG. 2 illustrates the fuel-cell system 103 according to this disclosure. Fuel-cell system 103 comprises a first fuel cell 115, a second fuel cell 117, a hydrogen gas tank 119, and a contactor 121. During operation of fuel-cell system 103, hydrogen gas flows from the hydrogen gas tank 119 into both the first fuel cell 115 and the second fuel cell 117. The fuel cells 115, 117 combine the hydrogen gas with oxygen to generate electrical energy, which is available for use by load 123 of rotorcraft 101. For example, electric motor 113 is powered by fuel-cell system 103 and is typically a portion of load 123. Other powered elements, such as lighting elements, controllers, environmental systems, etc., of rotorcraft 101 are contemplated being a portion of load 123. Each fuel cell 115, 117 is remotely monitored for voltage production, current generation, and fuel supply.

The first fuel cell 115 is configured to produce 270 VDC and comprises a selected stack of fuel cell plates 125, a positive node 127, a negative node 129, and a fuel input 131. The second fuel cell 117 is configured to produce 270 VDC and comprises a selected stack of fuel cell plates 133, a positive node 135, a negative node 137, and a fuel node 139. The positive node 127 of the first fuel cell 115 is electrically coupled to a positive node 141 of load 123 through the contactor 121. The negative node 137 of the second fuel cell 117 is electrically coupled to a negative node 143 of load 123 through the contactor 121. A positive 270 VDC will exist between the positive node 127 and the negative node 129. A negative 270 VDC will exist between the negative node 137 and the positive node 135. A positive 540 VDC will exist between the positive node 127 and the negative node 137. Each of the fuel cells 115, 117 produces one half of the power for the rotorcraft 101 and each of the fuel cells 115, 117 provides one half of the voltage required for the rotorcraft. A voltage generated collectively from the fuel cells 115, 117 is equal, or generally equal, to a voltage applied and required by the electrical load 123 as no DC-DC converters or power electronics are utilized between the fuel cells 115, 117 and the electrical load 123.

Contactor 121 is typically remotely controlled and configured to selectively connect and disconnect the fuel-cell system 103 electrically from the load 123. In the preferred embodiment, the contactor 121 features integral sensors for voltage detection and current detection which indicate the conditions of the load 123 or fuel cells 115, 117. For example, the load 123 may short out and damage the fuel cells 115, 117. The integral sensors enable the contactor 121 to detect condition and issues with the fuel cells 115, 117 or the load 123. In an alternative embodiment, the sensors are located external to the contactor 121. The negative node 129 of the first fuel cell 115 is electrically coupled to the positive node 135 of the second fuel cell 117 and collectively they are electrically grounded. The first fuel cell 115 is not in parallel electrically with the second fuel cell 117 as only one electrical node of the first fuel cell 115 is electrically coupled to the second fuel cell 117.

Figure 3:
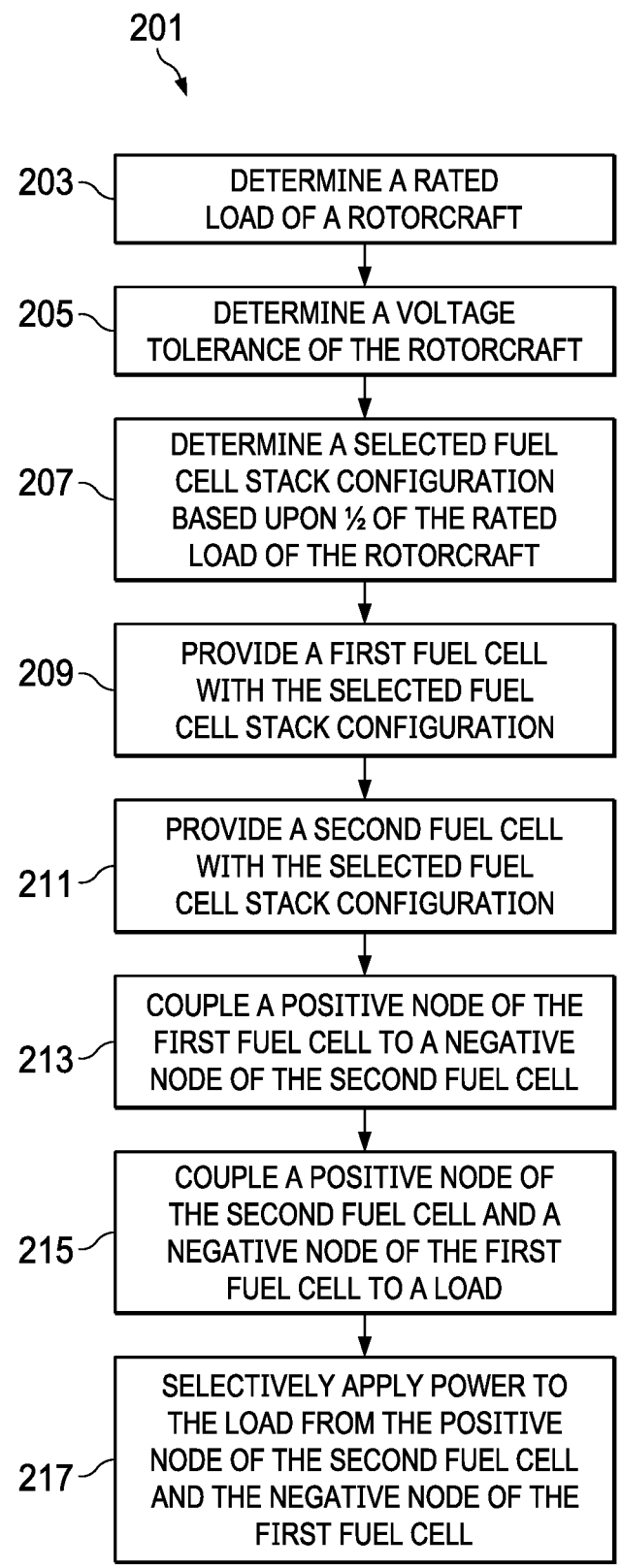
FIG. 3 is a diagram of a method of powering a rotorcraft with ±270 VDC from dual fuel cells according to this disclosure.

FIG. 3 illustrates a method 201 of powering a rotorcraft with ±270 VDC from dual fuel cells according to this disclosure. Initially, at block 203 a determination of a rated load of rotorcraft 101 is made. Typically, each power consuming device is documented for power requirements at full load and during startup. Next, at block 205 a determination is made regarding the voltage tolerance for each of the power consuming devices of rotorcraft 101. For example, a flight control computer may have a tolerance of ±a volt whereas the motor 113 for propulsion may have a tolerance of ±ten volts. A selected fuel cell stack configuration at block 207 is made based upon ½ of the power requirements determined in block 203 along with the determined voltage tolerances of block 205. The selected fuel cell stack configuration is chosen so that nominally every power consuming device is adequately powered from the selected fuel cell stack. The selected fuel cell stack configuration can be varied based upon the voltage tolerance determination of block 205.

At block 209 the first fuel cell 115 is provided with the selected fuel cell stack configuration determined in block 207. Next, at block 211 the second fuel cell 117 is provided with the selected fuel cell stack configuration determined in block 207. At block 213 the positive node 127 of the first fuel cell 115 is coupled to the negative node 137 of the second fuel cell 117. Then, at block 215 the positive node 135 of the second fuel 117 and the negative node 129 of the first fuel cell 115 is coupled to the load 123. The contactor 121 facilitates selectively applying power at block 217 from a combined first fuel cell and second fuel cell to the load 123. When a failure or problem is detected in either fuel cell 115, 117 the system isolates the load 123 from both fuel cells 115, 117 preferably through contactor 121.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fuel-cell system for powering an electrical load of a rotorcraft, comprising:
   a first fuel cell having a positive node and a negative node;
   a second fuel cell having a positive node and a negative node, the positive node of the second fuel cell being electrically coupled to the negative node of the first fuel cell; and
   a contactor coupling the positive node of the first fuel cell to the electrical load and coupling the negative node of the second fuel cell to the electrical load;
   wherein each fuel cell is coupled to the electrical load of the rotorcraft without a converter or other power electronics; and
   wherein each fuel cell is configured to provide one half of a voltage required by the electrical load.

2. The fuel-cell system of claim 1, wherein the contactor is configured to electrically isolate the electrical load from the first fuel cell and the second fuel cell.

3. The fuel-cell system of claim 1, wherein the contactor is configured to electrically isolate the electrical load from the first fuel cell and the second fuel cell; and
   wherein the contactor is configured to detect conditions with the electrical load.

4. The fuel-cell system of claim 1, wherein the contactor is configured to electrically isolate the electrical load from the first fuel cell and the second fuel cell; and
   wherein the contactor is configured to detect conditions with at least one of the fuel cells.

5. The fuel-cell system of claim 1, wherein the contactor is configured to electrically isolate the electrical load from the first fuel cell and the second fuel cell;
   wherein the contactor is configured to detect conditions with the electrical load; and
   wherein the contactor is configured to detect conditions with at least one of the fuel cells.

6. The fuel-cell system of claim 1, wherein the voltage required by the electrical load is 540 VDC.

7. A fuel-cell system for powering an electrical load of a rotorcraft, comprising:
   a first fuel cell having;
      a positive node; and
      a negative node; and
   a second fuel cell having;
      a positive node; and
      a negative node;
   wherein the negative node of the first fuel cell is electrically coupled to the positive node of the second fuel cell;
   wherein the electrical load is coupled without a converter or other power electronics to the positive node of the first fuel cell and the negative node of the second fuel cell; and
   wherein the first fuel cell and the second fuel cell provide similar voltage.

8. The fuel-cell system of claim 7, further comprising:
   a contactor;
   wherein the contactor is configured to electrically isolate the electrical load from the first fuel cell and the second fuel cell.

9. The fuel-cell system of claim 7, further comprising:
   a contactor;
   wherein the contactor is configured to electrically isolate the electrical load from the first fuel cell and the second fuel cell; and
   wherein the contactor is configured to detect conditions with the electrical load.

10. The fuel-cell system of claim 7, further comprising:
a contactor;
wherein the contactor is configured to electrically isolate the electrical load from the first fuel cell and the second fuel cell; and
wherein the contactor is configured to detect conditions with at least one of the fuel cells.

11. The fuel-cell system of claim 7, further comprising:
a contactor;
wherein the contactor is configured to electrically isolate the electrical load from the first fuel cell and the second fuel cell;
wherein the contactor is configured to detect conditions with the electrical load; and
wherein the contactor is configured to detect conditions with at least one of the fuel cells.

12. The fuel-cell system of claim 1, wherein the negative node of the first fuel cell and the positive node of the second fuel cell are electrically coupled to a ground.

13. The fuel-cell system of claim 1, wherein the voltage supplied by the first fuel cell is +270 VDC and the voltage supplied by the second fuel cell is −270 VDC.

14. The fuel-cell system of claim 7, wherein the negative node of the first fuel cell and the positive node of the second fuel cell are electrically coupled to a ground.

15. The fuel-cell system of claim 7, wherein the voltage supplied by the first fuel cell is +270 VDC and the voltage supplied by the second fuel cell is −270 VDC.

\* \* \* \* \*